(12) United States Patent
Meyer et al.

(10) Patent No.: US 8,809,715 B2
(45) Date of Patent: Aug. 19, 2014

(54) PUSH BUTTON WITH CABLE

(75) Inventors: Jörg Meyer, Wagenfeld (DE); Andreas Giefer, Lemfoerde (DE); Wolfgang Kliemannel, Lemfoerde (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1987 days.

(21) Appl. No.: 11/576,742

(22) PCT Filed: Oct. 7, 2005

(86) PCT No.: PCT/DE2005/001798
§ 371 (c)(1),
(2), (4) Date: Apr. 5, 2007

(87) PCT Pub. No.: WO2006/039897
PCT Pub. Date: Apr. 20, 2006

(65) Prior Publication Data
US 2009/0014302 A1 Jan. 15, 2009

(30) Foreign Application Priority Data
Oct. 8, 2004 (DE) .................. 10 2004 049 435

(51) Int. Cl.
| H01H 17/00 | (2006.01) |
| G05G 1/02 | (2006.01) |
| G05G 7/02 | (2006.01) |
| H01H 3/36 | (2006.01) |
| F16C 1/10 | (2006.01) |
| F16C 1/12 | (2006.01) |
| G05G 7/04 | (2006.01) |

(52) U.S. Cl.
CPC .. G05G 1/02 (2013.01); G05G 7/02 (2013.01); H01H 3/36 (2013.01); F16C 1/10 (2013.01); F16C 1/12 (2013.01); G05G 7/04 (2013.01)
USPC .......................................... 200/331; 200/314

(58) Field of Classification Search
USPC .................. 200/5 A, 5 R, 310–314, 331–336, 200/341–345
See application file for complete search history.

(56) References Cited

U.S. PATENT DOCUMENTS

| 4,514,600 | A | * | 4/1985 | Lentz ............................ 200/5 R |
| 4,788,447 | A | * | 11/1988 | Kiyono et al. ............... 307/10.1 |
| 4,954,668 | A | * | 9/1990 | Sako ............................. 200/314 |
| 5,023,417 | A | * | 6/1991 | Magiera ....................... 200/331 |
| 5,161,633 | A | * | 11/1992 | Torrielli et al. .............. 180/170 |

(Continued)

FOREIGN PATENT DOCUMENTS

| DE | 1 732 105 | 10/1956 |
| DE | 1 752 469 | 9/1957 |

(Continued)

Primary Examiner — Shawki S Ismail
Assistant Examiner — Lisa Homza
(74) Attorney, Agent, or Firm — McGlew and Tuttle, P.C.

(57) ABSTRACT

A push-button device (1) is provided for actuating a technical system (2), especially in a motor vehicle. The push-button device (1) comprises at least one push button (6) as well as a holding device (10). The push button (6) is arranged in the holding device (10) and can be moved between a neutral position and an actuation position. The push-button device (1) is characterized according to the present invention in that a flexible cable device (3) for signal transmission is arranged between the push button (6) and the technical system (2).

6 Claims, 3 Drawing Sheets

(56) References Cited

U.S. PATENT DOCUMENTS

| | | | |
|---|---|---|---|
| 5,451,733 A * | 9/1995 | Olson et al. | 200/315 |
| 5,788,060 A * | 8/1998 | Kuroda | 200/343 |
| 5,927,483 A * | 7/1999 | Yamada | 200/343 |
| 5,990,432 A * | 11/1999 | Kuroda | 200/343 |
| 6,274,832 B1 * | 8/2001 | Tachibana | 200/343 |
| 6,570,111 B2 * | 5/2003 | Nakagawa et al. | 200/343 |
| 6,740,830 B2 * | 5/2004 | Sato et al. | 200/343 |
| 6,809,273 B2 * | 10/2004 | Ito et al. | 200/5 R |
| 7,005,588 B2 * | 2/2006 | Pihlaja | 200/5 A |
| 7,102,090 B2 * | 9/2006 | Morisada | 200/296 |
| 7,126,069 B2 * | 10/2006 | Mukougawa et al. | 200/293 |
| 7,173,205 B2 * | 2/2007 | Yamamoto | 200/343 |
| 7,381,919 B1 * | 6/2008 | Yu et al. | 200/296 |
| 7,446,276 B2 * | 11/2008 | Plesko et al. | 200/343 |

FOREIGN PATENT DOCUMENTS

| | | |
|---|---|---|
| DE | 33 07 541 A1 | 9/1984 |
| DE | 34 05 892 A1 | 8/1985 |
| EP | 0 285 299 A2 | 10/1988 |
| EP | 1 455 039 A2 | 9/2004 |
| GB | 2 214 593 | 9/1989 |

\* cited by examiner

PUSH BUTTON WITH CABLE

CROSS REFERENCE TO RELATED APPLICATIONS

This application is a United States National Phase application of International Application PCT/DE2005/001798 and claims the benefit of priority under 35 U.S.C. §119 of German Patent Application DE 10 2004 049 435.5 filed Oct. 8, 2004, the entire contents of which are incorporated herein by reference.

FIELD OF THE INVENTION

The present invention pertains to a push-button device for actuating a technical system, especially in a motor vehicle, and more particularly to a push-button device with at least one push button as well as a holding means in which the push button, movable between a neutral position and an actuation position, is arranged.

BACKGROUND OF THE INVENTION

Push buttons and push-button devices of the type mentioned in the introduction are used, for instance, but by no means exclusively, in motor vehicles in the passenger compartment or within easy reach of the driver. Such push buttons are used in such applications to actuate a great variety of technical systems and means on the motor vehicle, for example, the air conditioner, window lifter, seat adjustment and the like.

An electrical contact is frequently actuated by such push buttons and the electric signal thus generated activates the intended function of the system to be controlled. The relative arrangement in space of the technical system to be controlled and the push button can be selected nearly as desired in such a case of the electrical connection of the push button to the system to be controlled because the flexible electrical connection can be installed extensively freely. The compensation of any dimensional tolerances in terms of the distances between the push button and the technical system to be controlled is also problem-free for the same reason, especially if the push button and the technical system are arranged or mounted on different mechanical carriers.

However, the statements made above are not true especially when there is no electrical connection between the push button and the technical system to be connected, but the technical system is rather in mechanical connection with the push button.

Even though tolerances do not, as a rule, play a major role if the push button and the technical system to be controlled are arranged in one and the same housing or on one and the same mechanical carrier, tolerances will develop, mostly inevitably, between the installation site of the push button and that of the technical system as soon as the technical system to be controlled is located on a carrier different from that on which the push button used for the control is located.

For example, push buttons on the motor vehicle are frequently arranged in the area of the instrument panel or in the center console, always essentially in the area of the control surface. However, the technical systems controlled herewith are usually not anchored on the surface of, for example, the instrument panel or the center console, but are rather connected to a carrier that is located under it and is a rigid part of the body or to the body itself.

However, there often are considerable tolerances in the distances between the installation site of the push button and that of the system to be controlled. These tolerances are often in the range of a few mm in each of the three directions in space, for example, because of the considerable size of components, such as the instrument panel or the center console, because of the plastic materials used for these components, as well as because of tolerances of the body structure itself, and because of other tolerances of the mounting systems used for the assembly.

These distance tolerances between the installation site of the push button and the installation site of the technical system to be controlled must then be compensated by means of a separate setting operation in a complicated manner and hence at a high cost in order to ensure the function of the push-button actuation.

Furthermore, thermal expansions may also occur, which assume quite substantial orders of magnitude in case of the temperature differences occurring in a motor vehicle. The precision of the mechanical connection between the push button and the technical system to be controlled suffers in such a case. Automatic triggering of the function of the technical system or failure of the ability of the technical system to be operated, for example, because of thermal expansions, may occur in the worst case.

SUMMARY OF THE INVENTION

Against this background, the object of the present invention is to provide a push-button device with which the drawbacks of the state of the art can be overcome. In particular, the push-button device shall permit the mechanically separate arrangement of the push button and the technical system to be controlled. Impairment of the actuation of the technical system by means of the push button or impairment of the precision of the push-button device due to tolerances between the installation sites of the push button and the technical system shall be permanently avoided in a simple manner, as a result of which mounting shall be facilitated, mounting costs shall be saved and permanent operational reliability and the maintenance-free nature of the push-button device shall be guaranteed.

According to the invention, a push-button device for actuating a technical system, especially in a motor vehicle is provided as well as a motor vehicle push-button system with a vehicle technical system. The device and system comprise a push button movable to an actuation position and a holding means for holding the push button, the push button being arranged in the holding means and being movable between a neutral position and the actuation position. A flexible cable means is provided for transmitting an actuation movement, corresponding movement of the push button into the actuation position, to the automobile technical system. The flexible cable means is arranged between the push button and the technical system.

An actuating device with improved reliability and failsafeness is created by the present invention. The need for the complicated adjustment of the mechanical connection between the push button and the system to be controlled as a consequence of unavoidable dimensional tolerances between the corresponding installation sites is now eliminated in a simple and cost-effective manner. The effects of changes in distances and positions on switching precision and the reliability of mechanical push-button device, for example, as a consequence of thermal expansions, are also eliminated with the present invention.

The push-button device according to the present invention is used, at first in a known manner per se, to actuate a technical system or to trigger a function on a technical system, especially in a motor vehicle. In a likewise known manner, the push-button device comprises at least one push button as well as a holding means. The push button is arranged in the holding means such that it can be moved to and fro between a neutral position and an actuating position.

However, the push button is characterized according to the present invention in that a flexible cable means is arranged between the push button and the technical system for transmitting the actuating signal from the push button to the technical system.

Due to the flexibility of the cable means, not even greater tolerances of the distances between the installation sites of the push button and the technical system, nor, for example, temperature-related thermal expansions and changes in the distance between the push-button device and the technical system cause any problem any longer. Such tolerances or changes in distance are rather readily absorbed and compensated by the flexible cable means without the switching precision of the push button or the reliability of the actuation of the technical system being compromised.

The type and the design of the cable means are at first irrelevant for the embodiment of the present invention as long as changes in the relative positions of the push-button device and the technical system to be controlled do not bring about any changes in the switching position and precision of the push button and the technical system. This condition is met especially by cable means that are composed of an inner cable and an outer sheath, because both the action forces occurring during the actuation of the push button (via the inner cable) and the reaction forces (via the outer sheath) are now transmitted coaxially.

According to a preferred embodiment of the present invention, the cable means comprises, in the manner of a Bowden cable, a cable for transmitting pulling forces. This embodiment has the advantage of having a simple and inexpensive design as well as high reliability. The cable means as well as the mechanisms of the push-button device as well as the technical system are reset after the actuation, for instance, by means of one or more resetting springs, at least one resetting spring being arranged in the area of the technical system in order to return, starting from there, the cable as well as optionally also the actuating mechanisms in the technical system as well as in the push-button device into the starting position after actuation of the push button.

According to an alternative embodiment of the present invention, the cable means comprises a flexible wire for transmitting pulling and/or compressive forces between the push-button device and the technical system being controlled. A cable means with a flexible wire, which also permits, in particular, compressive forces to be transmitted, has various advantages. For example, the shape of the push-button device can thus be simplified in such a way that the compressive force applied during the actuation of the push button is directly transmitted to the flexible wire. The otherwise necessary conversion of the compressive force generated at the push button into a pulling force compatible with a cable can thus be eliminated. As an alternative or in addition hereto, this embodiment also has the advantage that the entire actuating mechanism including the push button and the cable means as well as optionally including the actuating elements being moved in the system being controlled can be moved back into the inoperative position from the actuation position with only a single resetting spring, and the compression spring may optionally be arranged in the area of the push-button device or in the area of the system to be controlled.

According to another embodiment of the present invention, a reversing lever is arranged in a pivotingly movable manner at the holding means of the push-button device. The reversing lever is used to convert the compressive forces introduced via the push button into pulling forces, which can be used especially to actuate a cable. The cable, which is especially inexpensive but can be used to transmit pulling forces only, can thus be used to transmit the compressive forces applied to the push button to the system to be controlled.

According to another preferred embodiment of the present invention, the push-button device comprises a resetting spring arranged between the holding means and the push button or between the holding means and the reversing lever. The push button and/or the reversing lever are thus returned from the actuation position into the inoperative position immediately after actuation of the push button.

Another preferred embodiment of the present invention pertains to a push-button device that comprises an electrical contact, which can be actuated by the push button and is arranged especially in the area of the push-button device. The electrical contact is preferably likewise connected to the technical system to be controlled and provided for controlling the same function of the technical system that can also be controlled by means of the cable means.

A number of other advantages can thus be achieved. Thus, thanks to the additional electrical contact, the actuation of the system to be controlled can take place during normal operation, for example, by means of the electrical contact, whereas the mechanical connection between the push button and the system to be controlled by means of the cable means represents a redundancy fall-back level, which guarantees reliable actuation of the system to be controlled even in case of failure of the electrical function.

Another possibility of using this embodiment of the present invention lies, for example, in that the mechanical connection between the push button and the system to be controlled by means of the cable means can be used to actuate the system to be controlled when no electrical energy is available. This may happen, for example, when the ignition key has been removed or the ignition is switched off. If the ignition is switched on again or electrical energy is again available in another manner, the actuation of the system to be controlled can again take place via the electrical contact arranged in the area of the push-button device.

The present invention will be explained in more detail below on the basis of embodiments used as exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
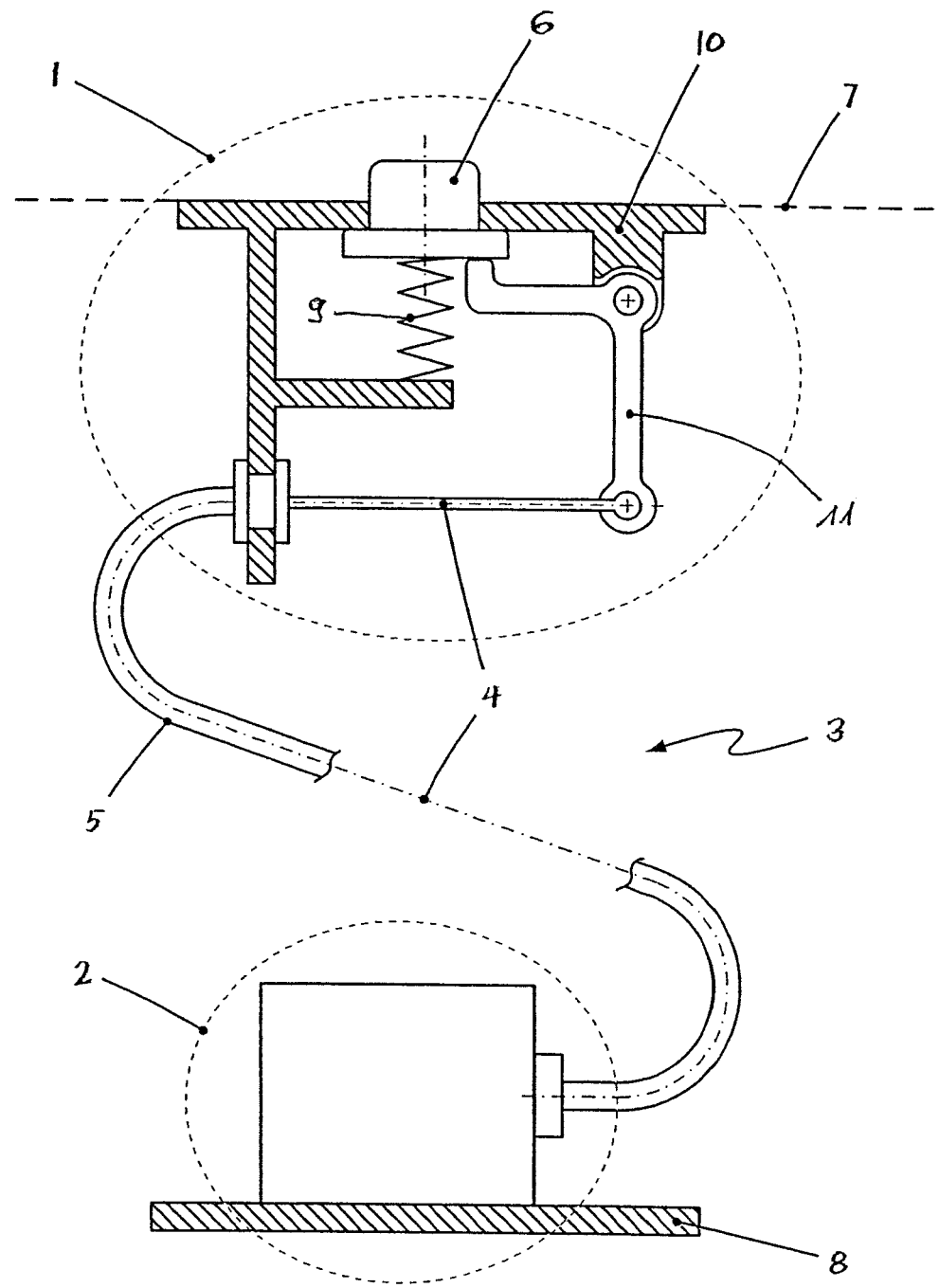
FIG. 1 is a schematic sectional view of a first embodiment of a push-button device with cable as well as with a technical system to be controlled.

Referring to the drawings in particular, FIG. 1 schematically shows a first embodiment of a push-button device according to the present invention. The push button 1, the system 2 to be controlled, which is indicated only schematically, as well as the cable means 3 are recognized at first. The cable means 3 comprises a flexible pulling cable and a likewise flexible outer sheath 5, which together form a cable 4, and it is used to pass on the switching commands initiated via the push button 6 to the system 2 to be controlled.

Since both the outer sheath 5 and the pulling cable are supported at their respective ends at the push-button device 1 and at the system 2 to be controlled, changes in the relative positions between the push-button device 1 and the system 2 to be controlled do not lead to any changes in the relative positions of the outer sheath 5 and the pulling cable. However, such changes in positions between the push-button device 1 and the system 2 to be controlled will thus also fail to have any effect on the switching precision of the push-button device 1 and on the switching position of the system 2 to be controlled.

It is therefore easily possible to arrange the push-button device 1, for example, in the area of the instrument panel or the center console 7 of a motor vehicle and to connect it to the instrument panel or the center console 7, while the system 2 to be controlled may be arranged, for example, on the floor panel 8 of the motor vehicle under the center console 7 and may also be connected to the floor panel 8. The tolerances of the distance between the center console 7 and the floor panel 8 can now be readily compensated because of the flexibility of the cable means 3 without this having any effects on the switching precision of the push-button device 1 as a consequence.

The complicated setting operations, which would otherwise become necessary in push-button device according to the state of the art to compensate the distance tolerances, are eliminated as a result as well. Any possible changes in the relative positions of the push-button device 1 and the system 2 to be controlled during the operation of the motor vehicle, for example, because of thermal expansions or the like, will also fail to affect the switching precision and the reliability of the push-button device.

Figure 2:
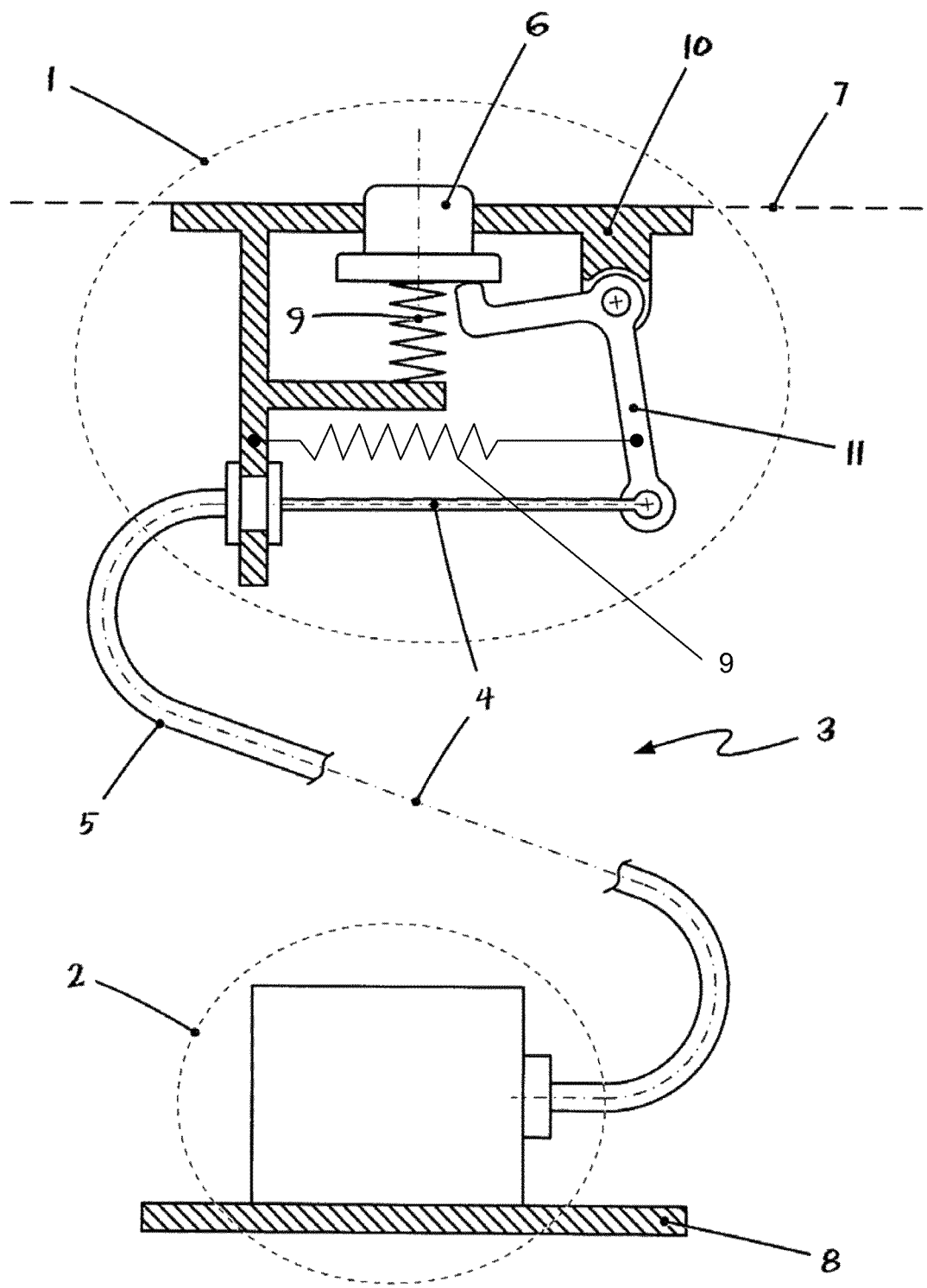
FIG. 2 is schematic sectional view, in a layout and view corresponding to FIG. 1, showing the push-button device according to FIG. 1 in the state of actuation.

FIG. 2 shows the push-button device 1 according to FIG. 1 at the moment of actuation of the push button 6. It is recognized that the push button 6 is moved into the actuation position according to FIG. 2 from its inoperative position according to FIG. 1 against the resetting force of the resetting spring 9 in relation to the holding means 10. This leads to pivoting of the reversing lever 11, as a result of which the pulling cable of the cable means 3 is in turn placed under tensile stress or moved in relation to the outer sheath 5, which leads to a corresponding actuation of the system 2. The resetting of the push-button device 1, the cable means 3 as well as of the corresponding actuating parts (not shown) of the technical system 2 from the actuation position according to FIG. 2 into the starting position according to FIG. 1 takes place on the basis of the resetting spring 9 as well as optionally by means of another resetting spring (likewise not shown) in the area of the system 2.

Figure 3:
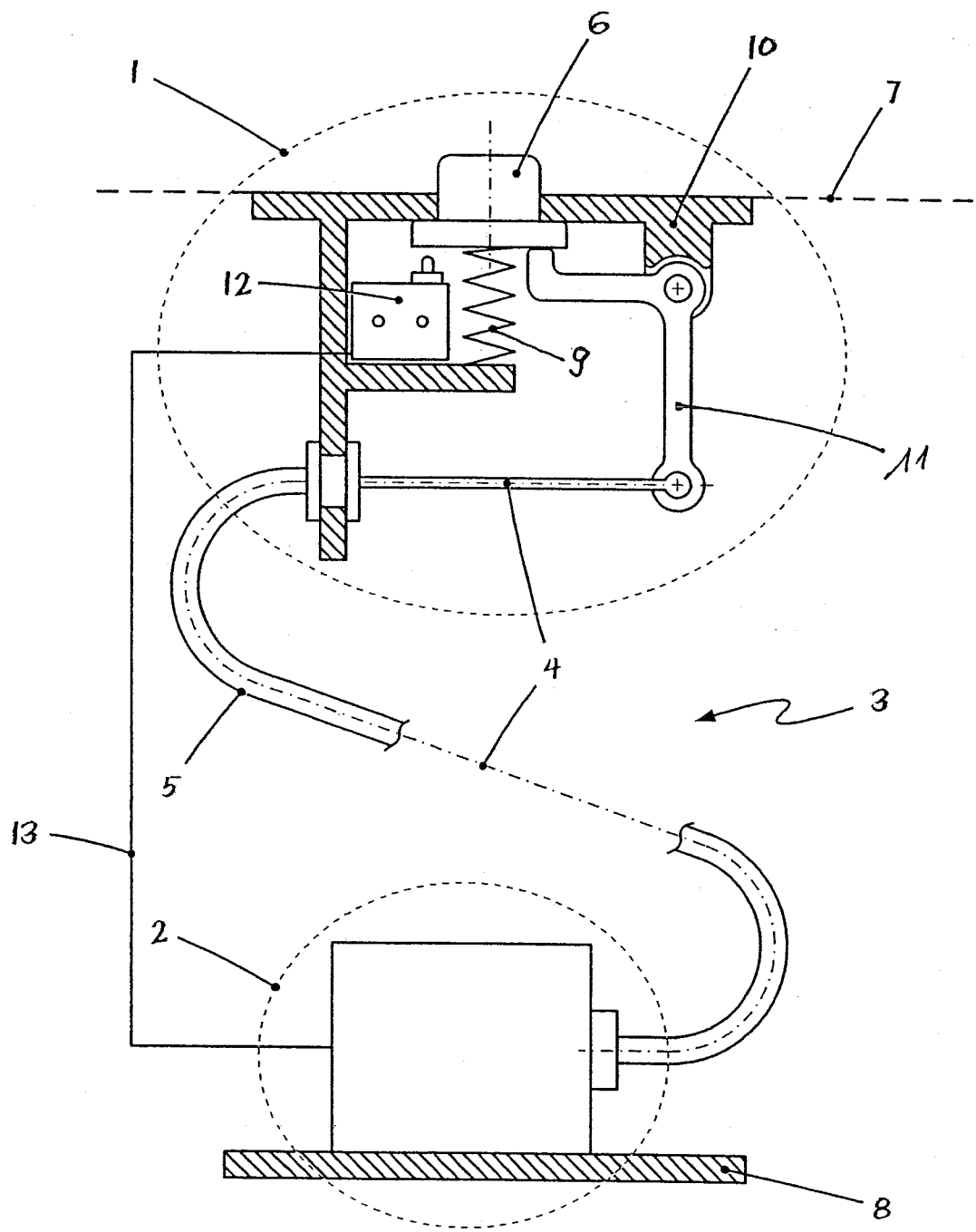
FIG. 3 is a schematic sectional view, in a layout and view corresponding to FIGS. 1 and 2, showing another embodiment of a push-button device with an additional electrical contact.

FIG. 3 shows another embodiment of a push-button device 1 according to the present invention with the system 2 to be controlled as well as with a cable means 3. The embodiment according to FIG. 3 differs from the embodiment according to FIG. 1 and FIG. 2 by the additional electrical contact 12, which is in connection, just as the cable means 3, with the system 2 to be controlled by means of the electrical connection 13. As was already explained above, the cable means 3 is used in the embodiment according to FIG. 3 especially as a mechanical fall-back level for the electrical connection, especially in case of failure of the electrical connection 12, 13, or at times at which no electrical energy is available.

Thus, it becomes clear as a result that thanks to the present invention, the reliability and the failsafeness of actuating elements can be improved with push buttons in a simple and cost-saving manner. Especially the complicated and therefore expensive setting of the mechanical connection between the push button and the system to be controlled, which is otherwise necessary as a consequence of unavoidable dimensional tolerances, is eliminated now thanks to the present invention. Changes in distances or positions which develop during the operation as a consequence of thermal expansion also have no effects on the switching precision and reliability of the actuating means any longer thanks to the present invention.

Thus, the present invention makes a considerable contribution to the improvement of actuating systems especially in motor vehicles. This is, last but not least, also beneficial for the improvement of the safety of the vehicle, the cost efficiency in production as well as for improved systems technology in the motor vehicle.

While specific embodiments of the invention have been shown and described in detail to illustrate the application of the principles of the invention, it will be understood that the invention may be embodied otherwise without departing from such principles.

The invention claimed is:

1. A push-button device for actuating a technical system, in a motor vehicle, the push-button device comprising:
   a push button;
   a holding means for holding said push button, said push button being arranged in said holding means, movable between a neutral position and an actuation position;
   a resetting spring arranged between said holding means and said push button, said resetting spring engaging said push button and a portion of said holding means;
   a flexible cable means for transmitting a signal to said technical system, said signal corresponding to actuation of said push button, said flexible cable means being arranged between said push button and said technical system;
   an electrical contact actuated by means of said push button, said electrical contact being connected to said technical system, wherein a same function of said technical system is actuated via said electrical contact as via said cable means; and
   a reversing lever for converting compressive forces introduced via push button into pulling forces, said reversing lever being arranged at said holding means in a pivotingly movable manner.

2. A push-button device in accordance with claim 1, wherein said cable means comprises a Bowden cable for transmitting pulling forces.

3. A push-button device in accordance with claim 1, wherein said cable means comprises a flexible wire for transmitting one or more of said pulling forces and said compressive forces.

4. A motor vehicle push-button system, comprising:
   a vehicle technical system;
   a push button movable to an actuation position;
   a holding means for holding said push button, said push button being arranged in said holding means and being movable between a neutral position and the actuation position;
   a resetting spring arranged between said holding means and said push button, said resetting spring having a first end portion and a second end portion, said first end portion being in contact with said push button, said second end portion being in contact with a portion of said holding means;

a flexible cable means for transmitting an actuation movement to said vehicle technical system, said actuation movement corresponding to movement of said push button into said actuation position, said flexible cable means being arranged between said push button and said vehicle technical system;

an electrical contact actuated by means of said push button, said electrical contact being connected to said vehicle technical system, wherein said vehicle technical system provides a function actuated by each of said electrical contact and said cable means; and a reversing lever for converting compressive forces, introduced via moving said push button to the actuation position, into pulling forces, said reversing lever being arranged at said holding means in a pivotingly movable manner.

5. A push-button system, comprising:

a vehicle technical system comprising one or more actuating mechanisms;

a push button movable to an actuation position;

a holding means for holding said push button, said push button being arranged in said holding means and being movable between a neutral position and the actuation position;

a reversing lever for converting compressive forces, introduced via moving said push button to the actuation position, into pulling forces, said reversing lever being arranged at said holding means in a pivotingly movable manner;

a resetting spring arranged between said holding means and said push button, said resetting spring engaging said push button and a portion of said holding means, said resetting spring being in a compressed state with said push button in said actuation position, said resetting spring being in a non-compressed state with said push button in said neutral position;

a flexible cable means for transmitting an actuation movement to said vehicle technical system, said actuation movement corresponding to movement of said push button into said actuation position, said flexible cable means being connected to said holding means and arranged between said push button and said vehicle technical system, wherein a function is actuated in said vehicle technical system with said push button in said actuation position, said one or more actuating mechanisms being in an actuated stated with said push button in said actuation position, said one or more actuating mechanisms being reset to a starting state after actuation of said push button; and an electrical contact actuated by means of said push button, said electrical contact being connected to said technical system for actuating a function of said technical system, wherein said cable means comprises a flexible wire or inner cable surrounded by an outer sheath, said flexible wire or inner cable for transmitting pulling and/or compressive forces to said technical system for actuating said function of said technical system.

6. A push-button device for actuating a technical system, in a motor vehicle, the push-button device comprising:

a push button;

a holding means for holding said push button, said push button being arranged in said holding means, movable between a neutral position and an actuation position;

a flexible cable means for transmitting a signal to said technical system, said signal corresponding to actuation of said push button, said flexible cable means being arranged between said push button and said technical system;

a reversing lever for converting compressive forces introduced via push button into pulling forces, said reversing lever being arranged at said holding means in a pivotingly movable manner; and a resetting spring arranged between said holding means and said reversing lever, one end of said resetting spring engaging said push button, another end of said resetting spring engaging a portion of said holding means, said resetting spring applying a force on said push button such that said resetting spring maintains said push button in said neutral position.

* * * * *